No. 774,029. PATENTED NOV. 1, 1904.
F. J. BEAUMONT.
GENERATING AND DISTRIBUTING ELECTRICITY ON RAILWAY
OR OTHER VEHICLES.
APPLICATION FILED SEPT. 30, 1901.
NO MODEL. 2 SHEETS—SHEET 1.
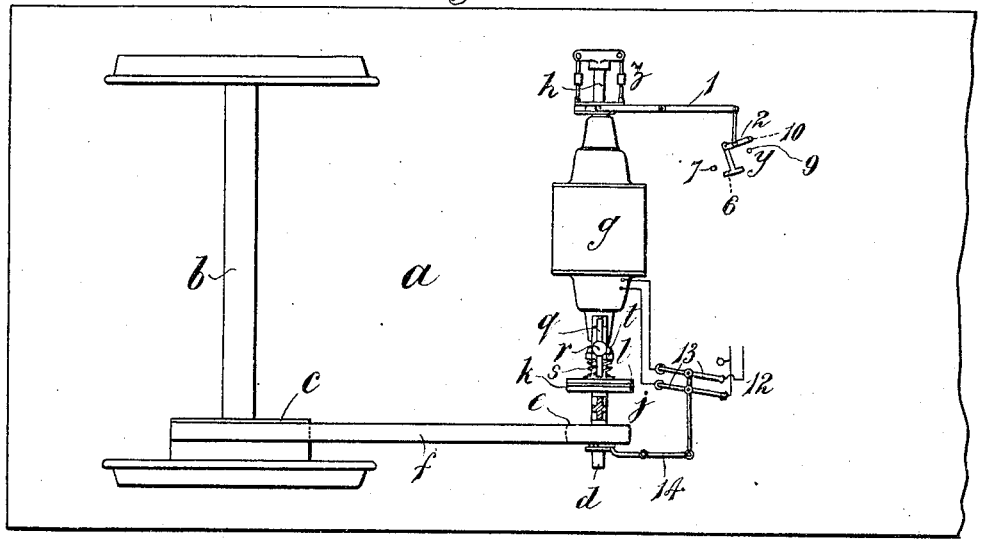
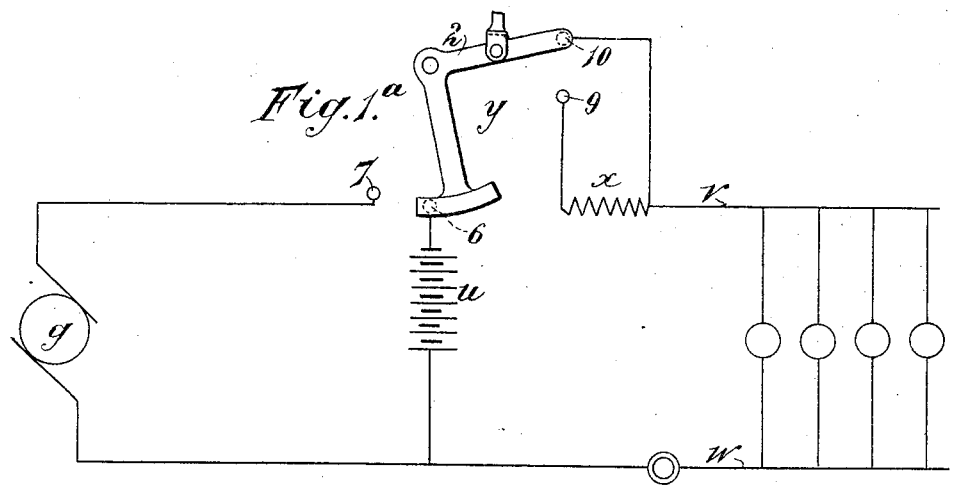
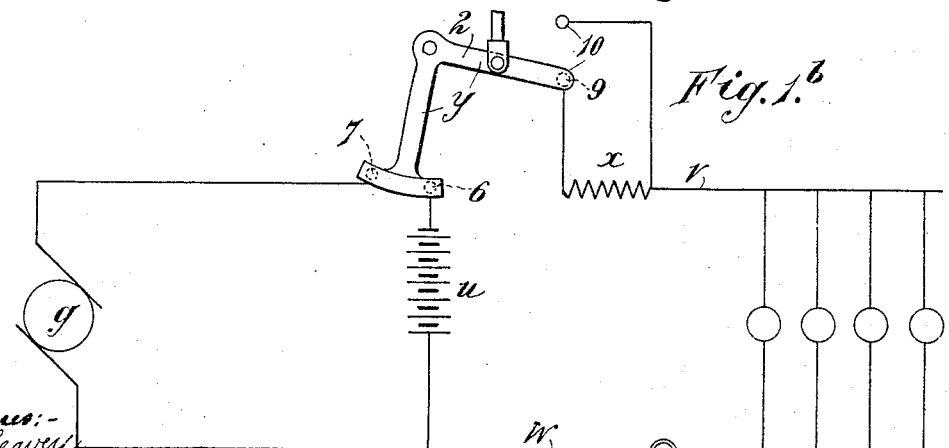

No. 774,029. PATENTED NOV. 1, 1904.
F. J. BEAUMONT.
GENERATING AND DISTRIBUTING ELECTRICITY ON RAILWAY
OR OTHER VEHICLES.
APPLICATION FILED SEPT. 30, 1901.
NO MODEL. 2 SHEETS—SHEET 2.
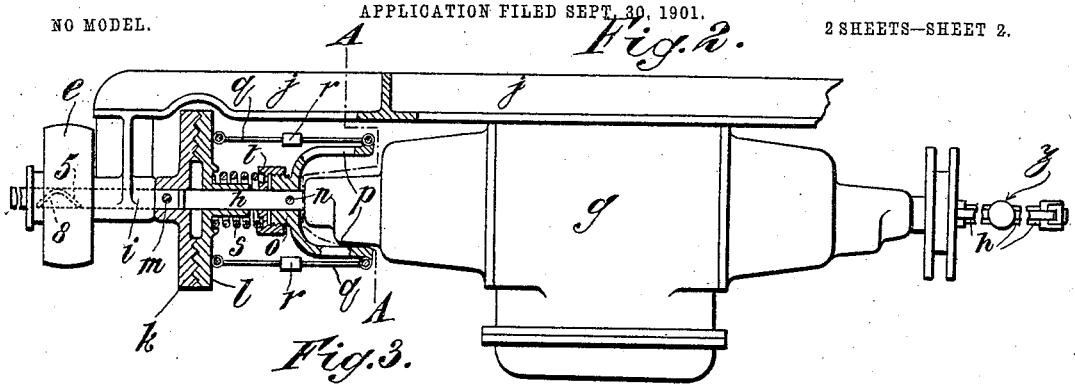
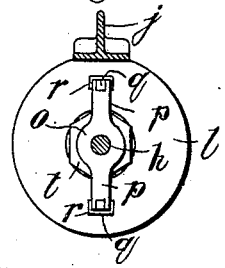
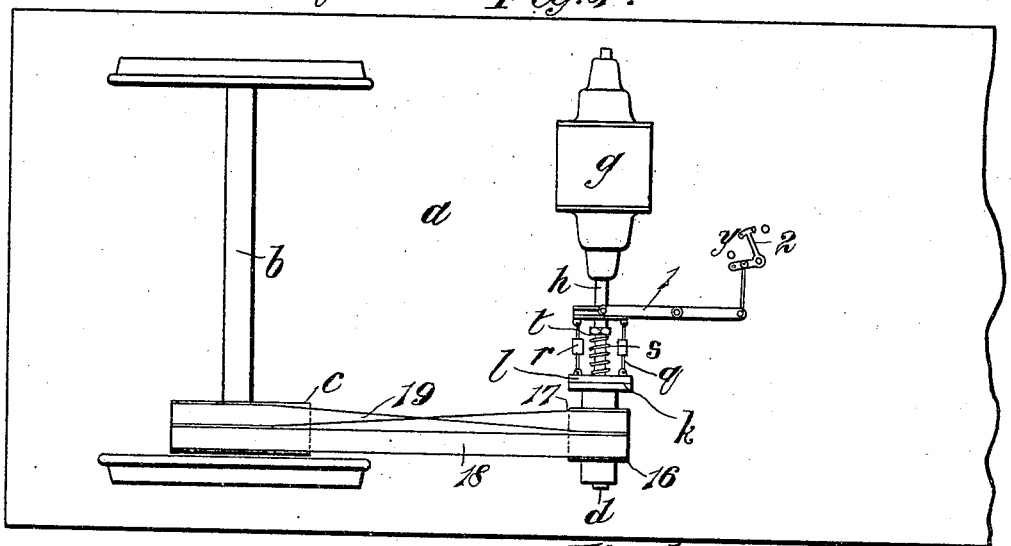
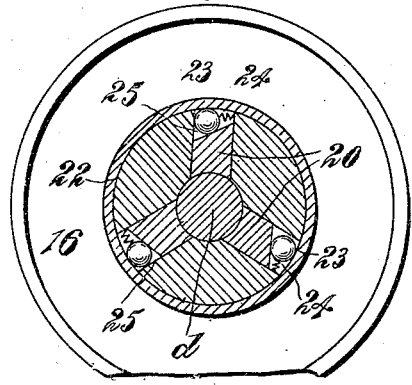
Witnesses:
E. Seavey
R. H. Bishop
F. J. Beaumont,
Inventor.
By Davis & Davis,
Attorneys.

No. 774,029. Patented November 1, 1904.

UNITED STATES PATENT OFFICE.

FREDERICK JOHN BEAUMONT, OF STROUD GREEN, ENGLAND.

GENERATING AND DISTRIBUTING ELECTRICITY ON RAILWAY OR OTHER VEHICLES.

SPECIFICATION forming part of Letters Patent No. 774,029, dated November 1, 1904.

Application filed September 30, 1901. Serial No. 77,105. (No model.)

*To all whom it may concern:*

Be it known that I, FREDERICK JOHN BEAUMONT, a subject of the King of Great Britain and Ireland, residing at Stroud Green, in the county of Middlesex, England, have invented Improvements in Generating and Distributing Electricity on Railway or other Vehicles, of which the following is a specification.

This invention has reference to means or apparatus whereby a dynamo-electric machine on a railway or other vehicle can be mechanically driven at a practically constant speed from an axle of the vehicle, notwithstanding variations of speed of rotation of such axle above a predetermined minimum speed. For this purpose a counter-shaft driven from one of the axles of the vehicle (hereinafter called for distinction the "driving-axle") has fixed to it a friction disk or wheel which faces another friction disk or wheel rotating with the shaft of the dynamo, but movable endwise upon the said dynamo-shaft under the action of a governor as the speed of the said shaft rises and falls. The arrangement is such that if the friction-disks be in contact the dynamo-shaft will be driven at the same speed as the counter-shaft, and when the speed of the vehicle, and consequently of the counter-shaft, dynamo-shaft, and governor, rises above a predetermined speed the governor will act to move the friction-disk on the dynamo-shaft out of contact with the friction-disk on the counter-shaft. On the speed of the dynamo-shaft again falling to the predetermined speed its friction-disk will be again brought into contact with that on the counter-shaft. The shaft of the dynamo will thus receive a series of impulses from the counter-shaft, which will cause it to rotate at a practically constant speed, notwithstanding variations in the speed of the driving-axle above the predetermined speed at which it will drive the dynamo at the rate required to give a practically constant electrical output. In this way after the dynamo has had the required speed of rotation imparted to it by the vehicle when traveling at a predetermined minimum rate its speed will practically not be varied when the vehicle travels at varying rates above the minimum rate. Suitable ball or other thrust bearings may be provided for the dynamo and counter-shafts.

In applying the invention to railway-carriages it is preferred to provide each carriage with the apparatus, so that each carriage will be complete in itself and can be used in a train with other carriages not fitted with such apparatus.

In conjunction with the dynamo on each vehicle there is a secondary battery, a resistance, and a switch, adapted to be actuated by a centrifugal governor, the arrangement being such that when the vehicle is at rest or traveling below the minimum speed which is sufficient to energize the dynamo, the secondary battery alone will be in circuit with the electric distributing-leads and when the vehicle attains the minimum speed which will allow the dynamo to generate current at a higher potential than that supplied from the battery to the leads the governor will cause the switch to assume a position in which the dynamo will be coupled to the secondary battery and a resistance will be inserted between the battery and the distributing-leads to compensate for the higher potential which the battery will have when charging or when working under a reduced load. A practically constant difference of potential between the two distributing-leads will thus be maintained, whether the dynamo be in circuit or not.

As will be obvious, the details of construction can be variously modified, and the means of maintaining a constant speed of rotation of the dynamo-shaft as long as the driving-axle rotates at or above a predetermined speed may be applied with various arrangements for transmitting motion from the driving-axle to the dynamo-shaft.

Referring to the accompanying illustrative drawings, Figure 1 is a diagrammatic plan of one arrangement of apparatus for generating and distributing electricity on a railway-vehicle for lighting purposes. Fig. 1$^a$ shows diagrammatically the dynamo, secondary battery, resistance, lamp-circuit, and switch, the switch being shown in the position it occupies when the vehicle is at rest. Fig. 1$^b$ is a similar view, but with the switch in its other extreme position. Fig. 2 is a sectional elevation of a portion thereof. Fig. 3 is a transverse section on the line A A, Fig. 2. Fig. 4 is a similar view to Fig. 1, illustrating a modification; and Fig. 5 is a detail view, hereinafter referred to.

Referring to Figs. 1 to 3, $a$ is the underframe of the vehicle; $b$, the driving-axle; $c$, a driving-pulley thereon; $d$, the counter-shaft; $e$, a driven pulley thereon, and $f$ the driving-belt passing around the pulleys $c$ and $e$. $g$ is the dynamo, which is of the inclosed type, and $h$ is its shaft. The counter-shaft $d$ is mounted in a bearing $i$, extending downwardly from one end of a frame $j$, by which the apparatus is attached to the underframe $a$ of the vehicle. The shafts $d$ and $h$ are in line with each other, and on the adjacent ends of the respective shafts the friction-disks $k$ and $l$ are mounted, the disk $k$ on the shaft $d$ being fixed thereto, for example, by a pin $m$, while the disk $l$ is connected to the shaft $h$ by a feather connection, so as to rotate therewith, but to be capable of endwise movement thereon. The friction-disks $k$ and $l$ are formed on their opposed surfaces with a series of annular concentric ridges and grooves which are preferably of approximately triangular form, as seen in section, Fig. 2, and arranged so that the ridge of the one takes into the grooves of the other. To the shaft $h$, at some little distance from the disk $l$, there is fixed by a pin $n$ a ring or collar $o$, from which project a number (in the example two) of arms $p$, each of which is connected by a blade-spring $q$ to the disk $l$. Each spring $q$ is provided with a weight $r$, so that the arrangement forms a sort of "Pickering governor." Between the fixed ring or collar $o$ and the boss of the friction-disk is interposed a spring $s$, the power of which is such as to hold the friction-disks $k$ and $l$ in contact in opposition to the pull of the weights due to centrifugal force when the driving-shaft rotates below a predetermined speed. To enable the disks to come in contact at any desired speed, the spring $s$ is arranged to abut against a nut $t$, screwed upon the ring or collar $o$, instead of directly against the said ring or collar. Thus by adjusting the nut $t$ the initial compression of the spring can be varied according to the speed at which it is desired to drive the dynamo-shaft. In Figs. $1^a$ and $1^b$ $u$ is the secondary battery, and $v$ and $w$ the leads. $x$ is the resistance, which when the dynamo is supplying current is switched into the lamp-circuit by means of a switch $y$, the movable part of which is controlled by a centrifugal governor $z$ of any suitable kind. In the example illustrated it comprises weighted springs, each connected at one end to arms secured to the dynamo-shaft and at the other to a ring which is formed with a groove, into which takes the forked end of a lever 1, jointed at its free end to the movable switch-contact 2. One pole of the battery $u$ is connected or adapted to be connected to the distributing-lead $w$ and to one terminal of the dynamo $g$. The other pole is connected to a stationary contact 6 of the switch $y$. The other terminal of the dynamo is connected to a second stationary switch-contact 7, and one end of the resistance $x$ is connected to a third stationary switch-contact 9, its other end being connected to the other distributing-lead $v$, which is connected to a fourth stationary switch-contact 10. The movable contact 2 is shown in Fig. $1^a$ in the position it occupies when the vehicle is at rest or traveling below the predetermined speed. The dynamo-circuit will be open and the resistance $x$ cut out, as shown in Fig. $1^a$, current being supplied to the lamp-circuit by the battery $u$. On the predetermined speed being reached the contact 2 will be moved into the position shown in Fig. $1^b$, when the dynamo and the resistance will be put in the lamp-circuit and the secondary battery connected in parallel. The speed of the dynamo-shaft is then maintained constant owing to the friction-disk $l$ being moved by the centrifugal action of the weights $r$ out of contact with the disk $k$ as the speed tends to rise and into contact therewith by the spring $s$ as the speed again falls. With apparatus for generating and distributing electricity on railway and other vehicles it is essential for successful working in the manner described that the friction-disks and the arrangement for operating them should be quick-acting and sensitive in order that a constant electrical output may be maintained, and the construction, combination, and arrangement of the various parts of the entire apparatus described are designed with this purpose in view. In the arrangement illustrated in order to avoid the use of means for insuring the driving of the dynamo-shaft in the one direction, whichever way the train may be traveling, the dynamo is provided with brushes which are fixed in a neutral position, and the field-windings are connected to them through a switch or pole-changer 12, whereby each brush will be automatically disconnected from one end of the field-coils and connected with the other end thereof upon the direction of rotation of the dynamo-shaft being reversed. The two movable contacts 13 of the switch 12 are connected to the two brushes and are actuated by the movement of the pulley $e$ endwise of the counter-shaft $d$ in one direction or the other, according to the direction in which the vehicle is traveling. This is effected by connecting the said pulley to its shaft by a pin or short key 5, projecting into a spiral keyway 8 in the shaft $d$ of such greater length than the key that the pulley will move endwise a short distance each time its direction is reversed. This movement is transmitted to the contacts 13 by a forked lever 14, which engages a groove in the boss of the pulley $e$, as shown.

In another arrangement (illustrated diagrammatically in Figs. 4 and 5) the dynamo-shaft is always driven in the same direction, for which purpose the counter-shaft $d$ is provided with a pair of pulleys 16 and 17, which are driven by open and crossed belts 18 and 19 from a single wide or two narrow pulleys $c$ on the axle $b$ and are provided with clutches so arranged that when the vehicle is traveling in a forward direction one of the pulleys—say 16—will be clutched to the counter-shaft, so as to rotate it, at which time the other pulley, 17, will rotate idly in the reverse direction on the counter-shaft, and when the vehicle travels in a backward direction the pulley 17 will be rotated in the reverse direction and become clutched to the counter-shaft, so as to rotate it in the same direction as before, while the pulley 16 will rotate idly in the reverse direction.

The clutches of the driven pulleys on the counter-shaft may be of any known or suitable kind—such as the ball, roller, or like clutches used with the free wheels of bicycles—or they may be centrifugal clutches, each comprising a number of jaws 20, Fig. 5, arranged radially around the counter-shaft within the boss 21 of the pulley, the outer portions of which jaws are inclined and have interposed between them and a concentric abutment-ring 22, carried by the pulley, a corresponding number of rollers 23, which are arranged parallel to the shaft-axis and may be pressed by springs 24, so as to give them a tendency to occupy the widest portions of the spaces 25 between the jaws 20 and the abutment-ring 22, the arrangement being such that when the pulley is rotated in one direction the rollers 23 will pass into the narrow portions of the spaces 25 and force the jaws 20 to grip, and thus drive the counter-shaft, while when the pulley is driven in the other direction the balls 23 will be returned to the widest portions and the jaws will move outward under the action of centrifugal force.

What I claim is—

1. In the herein-described means for transmitting power from a car-wheel axle to a dynamo on the car, an automatic speed-regulator comprising a pulley that is driven from the car-axle, a shaft that is to be driven from said pulley, a pair of similar friction-disks arranged face to face, the one being attached to said pulley and the other to said shaft so as to rotate therewith but slide endwise thereon, a plurality of weight-carrying blade-springs secured to said movable disk, and a coiled spring pressing said movable disk into contact with the first-mentioned disk, said blade-springs being adapted to overcome said coiled spring and positively move the disks out of contact at a predetermined speed, as set forth.

2. In the herein-described means for transmitting power from a car-wheel axle to a dynamo on the car, an automatic speed-regulator comprising a pulley that is driven from the car-axle, a shaft that is to be driven from said pulley, a pair of similar and serrated friction-disks arranged face to face, the one being attached to said pulley and the other to said shaft so as to rotate therewith but slide endwise thereon, a plurality of weight-carrying blade-springs secured to said movable disk, and a coiled spring pressing said movable disk into contact with the first-mentioned disk, said blade-springs being adapted to overcome said coiled spring and positively move the disks out of contact at a predetermined speed, as set forth.

Signed at 77 Cornhill, London, England, this 20th day of September, 1901.

FREDERICK JOHN BEAUMONT.

Witnesses:
   PERCY E. MATTOCKS,
   H. MAYKELS.